(12) United States Patent
Nemanick et al.

(10) Patent No.: US 12,038,350 B2
(45) Date of Patent: Jul. 16, 2024

(54) WIRELESS BATTERY LEAK DETECTION

(71) Applicant: The Aerospace Corporation, El Segundo, CA (US)

(72) Inventors: Eric Joseph Nemanick, Santa Monica, CA (US); Robert G. Will, Redondo Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 95 days.

(21) Appl. No.: 17/713,142

(22) Filed: Apr. 4, 2022

(65) Prior Publication Data

US 2023/0314262 A1 Oct. 5, 2023

(51) Int. Cl.
*G01M 3/16* (2006.01)
(52) U.S. Cl.
CPC ..................... *G01M 3/16* (2013.01)
(58) Field of Classification Search
None
See application file for complete search history.

(56) References Cited

U.S. PATENT DOCUMENTS 6,337,559 B1 * 1/2002 Sato ................. H01M 50/574
320/134

FOREIGN PATENT DOCUMENTS

| CN | 108028151 A | * | 5/2018 | ............. G01M 3/16 |
| DE | 102010012927 A1 | * | 9/2011 | ............. G01M 3/045 |
| JP | 2017073285 A | * | 4/2017 | ............. G01M 3/16 |
| KR | 20120051579 A | * | 5/2012 | |

OTHER PUBLICATIONS

English Translation of JP-2017073285-A (Year: 2017).*

* cited by examiner

*Primary Examiner* — Alexander A Mercado
(74) *Attorney, Agent, or Firm* — LeonardPatel PC

(57) ABSTRACT

An apparatus for detecting leaks in a battery includes a plurality of cells, each which include a pair of conductive leads bracketing a polymer seal, and a wireless measurement and communication chip ("chip") configured to perform capacitive measurement, showing a change in capacitance when bridged by ionically conductive species or when a wick is suffused with an electrolyte.

12 Claims, 10 Drawing Sheets

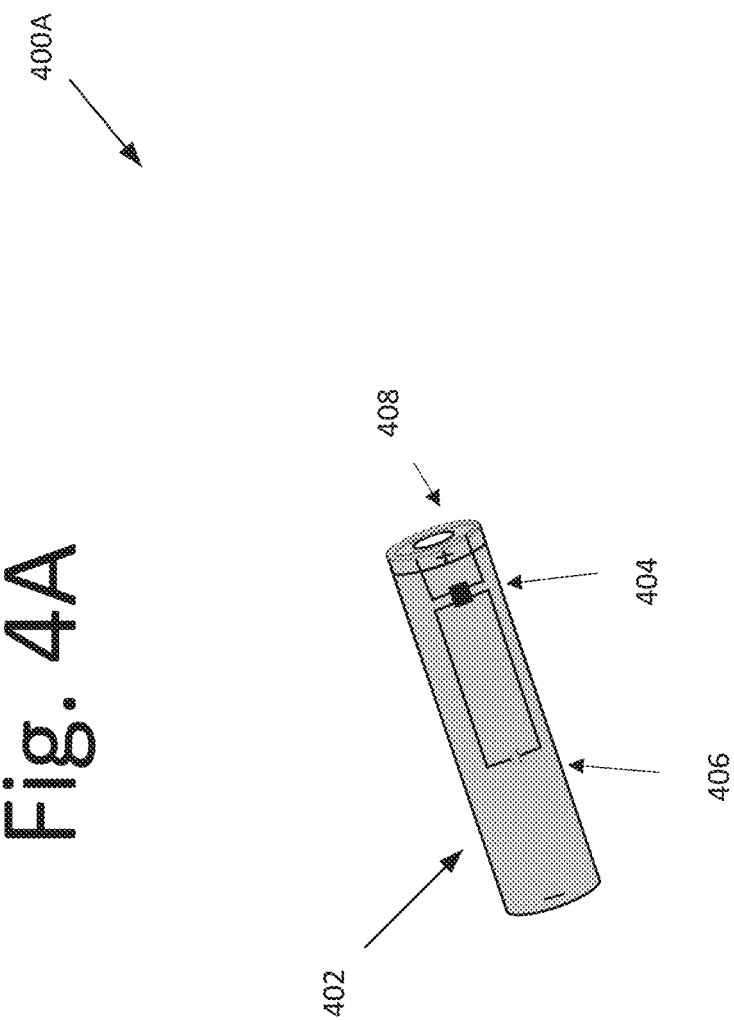

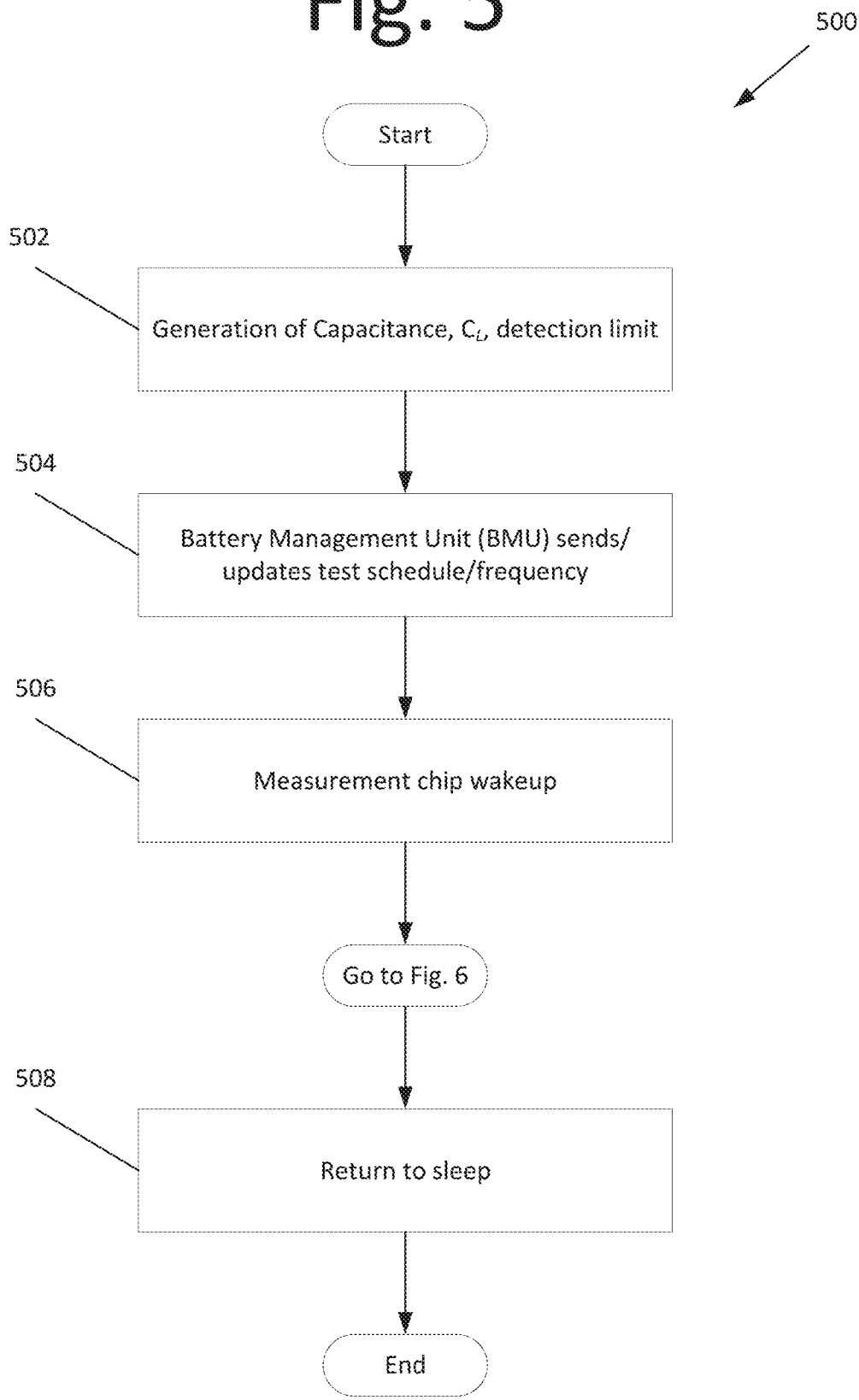

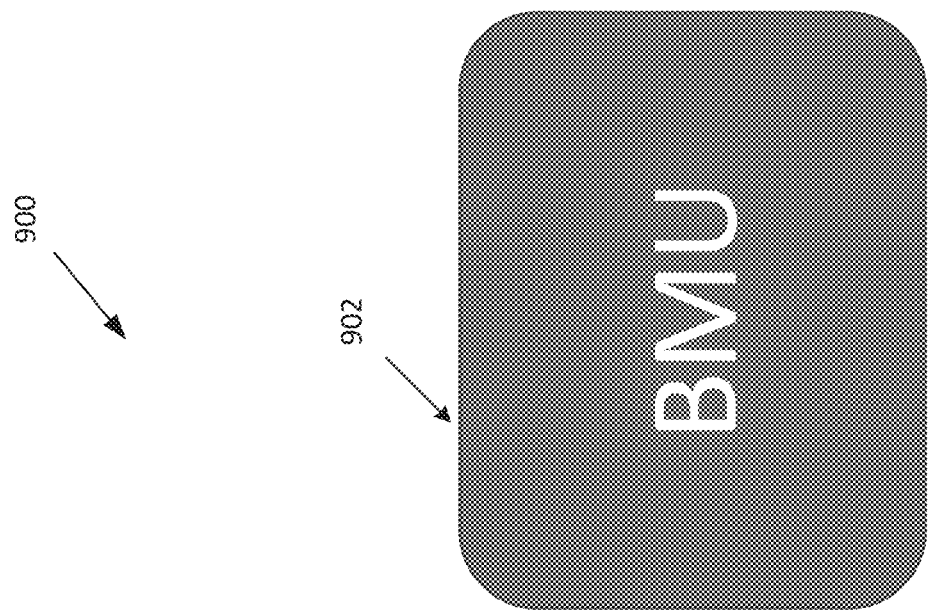
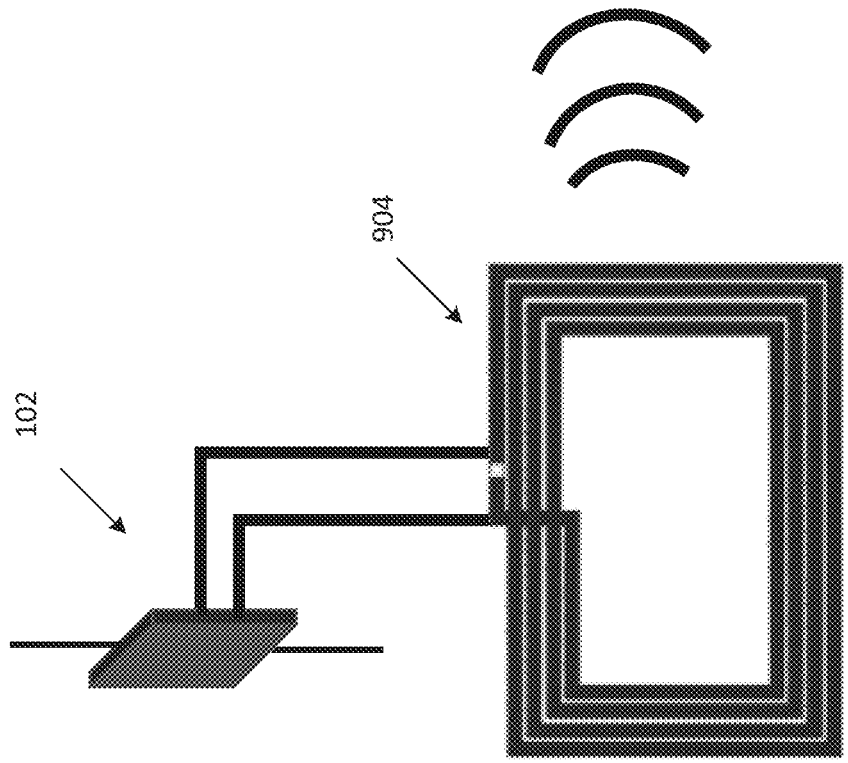
Fig. 9

WIRELESS BATTERY LEAK DETECTION

FIELD

The present invention relates to leak detection, and more particularly, to wireless battery leak detection.

BACKGROUND

Wireless leak detection uses on-battery cell chips to report leaks in individual cells to the battery management unit (BMU) to prevent catastrophic short circuits and fires.

However, batteries do not have the capability to detect dangerous leaks in cells without cumbersome and unreliable chemical vapor detection systems that cannot pinpoint the leak location for remediation, isolation, or cleanup. This technology is needed as flammable and corrosive electrolytes that leak out of battery cells can create an atmosphere that can ignite with a spark or pose a personnel hazard, in addition to damaging the powered device. These leaks can cause a catastrophic fires in applications such as electric vehicles, personal electronics, and medical devices. In addition, the electrolyte can react with water to form corrosive or toxic conditions which can otherwise harm human technicians or users.

Existing leak detection systems rely on an analysis of electrolyte gasses or optical changes in materials, or even direct measurement impedance at the location of the suspected leak, in order to detect the leak. For example, leaks have traditionally been detected through mass changes in individual batteries, an approach that requires removal of cells from a battery, and vapor detection systems collecting from all over a battery but cannot pinpoint a location on a leaking cell and cannot identify which cell is leaking. These approaches typically have poor sensitivity, with optical or electrical measurements only able to detect large leaks without localization.

Detection of leaks in batteries may prevent serious safety issues from battery leaks in many human centered battery applications such as electric vehicles, personal electronics, aircraft, and medical devices. Accordingly, an improved wireless battery leak detection system and method is needed.

SUMMARY

Certain embodiments of the present invention may provide solutions to the problems and needs in the art that have not yet been fully identified, appreciated, or solved by current battery leak detection technologies. For example, some embodiments of the present invention pertain to a leak detection system and/or method using wireless and remote detection and communication. A wireless leak detection system uses wireless communication to replace bulky harness wires and sensor wires in batteries, and can be localized at critical points in the cells as to where leaks can occur. A system employing the wireless leak detection has cell leads, measurement circuits, and communication capability built onto the cell wrapper or location, and includes a small measurement and control chip. In wireless leak detection, electrical leads are made utilizing sensor leads encompassing, adjacent to, or on locations where leaks may occur allowing for localized leak detection. A control chip at or adjacent to the location of the sensor may monitor the cell sensor for leaking electrolytes, and may wirelessly report a leaking cell back to the BMU. The BMU may then mitigate the leak through isolating the battery module, and/or alert the user to replace the cell or other remediation processes.

In one embodiment, an apparatus for detecting leaks in a battery includes a plurality of cells, each which include a pair of conductive leads bracketing a polymer seal, and a wireless measurement and communication chip ("chip") configured to perform capacitive measurement, showing a change in capacitance when bridged by ionically conductive species or when a wick is suffused with an electrolyte.

In another embodiment, a method for determining a leak detection threshold in a battery includes generating, by a measurement chip or battery management unit (BMU), a capacitance detection limit $C_L$, wherein the capacitance detection limit $C_L$ is based on a prior calibration of a sensor on a battery cell. The method also includes updating, by the BMU, a test schedule and/or frequency schedule received by the chip on the cell. The method further includes waking, or changing a state of, the chip from a "sleep mode" to a "awaken mode" to perform measurements on the battery cell, returning or changing the state of the chip from the "awaken mode" to the "sleep mode" after performing the measurement on the battery cell.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 4A and 4B are diagrams illustrating a cell for a leak detection system with detection of leaks at different locations, according to an embodiment of the present invention.

FIG. 5 is a flow diagram illustrating a method for determination of the leak detection threshold through the capacitance detection limit ($C_L$), according to an embodiment of the present invention.

FIG. 9 is a diagram illustrating a system comprising cell communicating with a BMU, according to an embodiment of the present invention

DETAILED DESCRIPTION OF THE EMBODIMENTS

Some embodiments pertain to detecting leaks in batteries using highly localized detection sensors, wireless communication, and signal filtering algorithms. For example, battery cells typically have one or more seals that may leak electrolytes during its life or other locations where leaks are likely to occur based on the application. In some embodiments, the system and/or method measures the capacitance across the seal by a sensor comprising of two or more conductive leads that are bridged by a material that may be wetted by the ionically conductive electrolyte. The measurement in the absence of a leak is the baseline capacitance between the leads, but in the presence of a leak, the measured signal demonstrates characteristic changes indicative of a leak. This can be seen in FIGS. 7 and 8 for the introduction of small amounts of electrolyte (FIG. 7) and for comparing the response of the sensor to electrolyte as compared to two typically confounding species, an organic liquid iso-propanol, and for high humidity (95% relative humidity) air. In response to the presence of the battery electrolyte, the capacitive sensor shows a substantial drop in the capacitance value of the leads and the separating space and materials between them. This measurement is performed by a capacitance measuring component of a chip (see FIG. 1 at 104) and the measurement of the capacitance change (a leak) is then communicated by this chip wirelessly to the battery management unit. Measurement of the capacitance may allow for individual cell and seal monitoring, which is very difficult for large batteries. Current systems do not use localized leak detection systems due to the large amount of cabling, electrical harnessing required for a signal to be transported back to the BMU for signal analysis to detect a leak. Furthermore current systems do not have the capability to locally measure and transmit signal changes.

Figure 1:
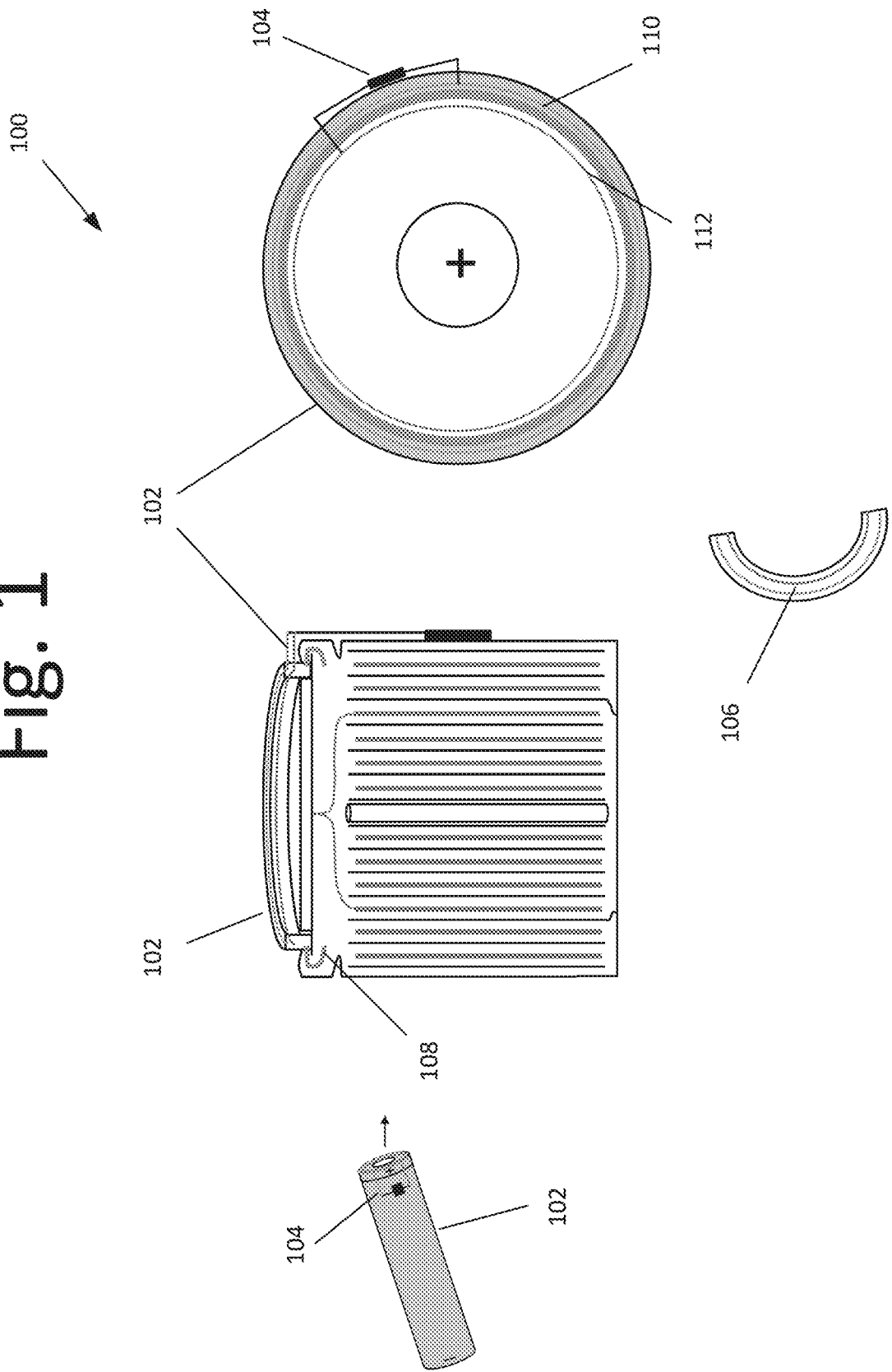
FIG. 1 is a diagram illustrating a leak detection system on a cylindrical cell, according to an embodiment of the present invention.

FIG. 1 is a diagram illustrating a leak detection system 100 on a cell 102, according to an embodiment of the present invention. With cell 102, there is a likely location for leaks to occur, i.e., at crimp seal 108. Crimp seal 108 is where a polymer 106 is compressed between two metal layers of the case. The rest of cell 102 is a solid drawn can with no welds in this example. This embodiment may also encompass cell designs where crimp seal 108 is welded close, and the leak detection leads can be at this or any location of concern for leaks, and not at crimp seal 108. For example, this could be on a cell location that is high risk for fracture or puncture from the application, such as a location with repeated bending or external pressure. Application may be defined as the use and environment cell 102 is being exposed to, with particular focus on stress that may cause cell 102 to leak.

For this detection, a pair of circular conductive leads—negative conductive lead 110 and positive conductive lead 112—are configured to bracket crimp seal 108. For purposes explanation, negative conductive lead 110 and positive conductive lead 112 will be now referred to as leads 110 and 112, respectively. Leads 110 and 112 are connected to a wireless measurement and communication chip ("chip") 104, and are contained in or on a selected polymer 106, or other material. Other material may be defined as natural fibers such as felt or paper, polymer meshes, metals, oxides, natural materials or resins.

In some embodiments, polymer 106 may be wet by the cell electrolyte or can wick the electrolyte between leads 110 and 112. Polymer 106 may be wetted by the electrolyte, and may be porous or permeable, allowing electrolyte connection of the electrolyte to leads 110 and 112. It should be appreciated that polymer 106 is chosen for its ability to be wet by the electrolyte and not by water or another interfering agent. Other interfering agents, for purposes of this application, may include alcohols, ketones, alkanes, or other environmentally present chemicals.

Depending on the embodiment, polymer (or polymer wick) 106 is a porous or nonporous hydrophobic (water hating) polymer as opposed to a hydrophilic polymer that would be wet by water. Since the flammable electrolytes of cells 102 are typically able to wet hydrophobic surfaces, polymer 106 creates an ionic bridge to form between leads 110 and 112 without water sources being able to do the same. Further, polymer (or wick material) 106 may be tailored to be wet by the electrolyte and not wet by any expected chemicals.

Figure 7:
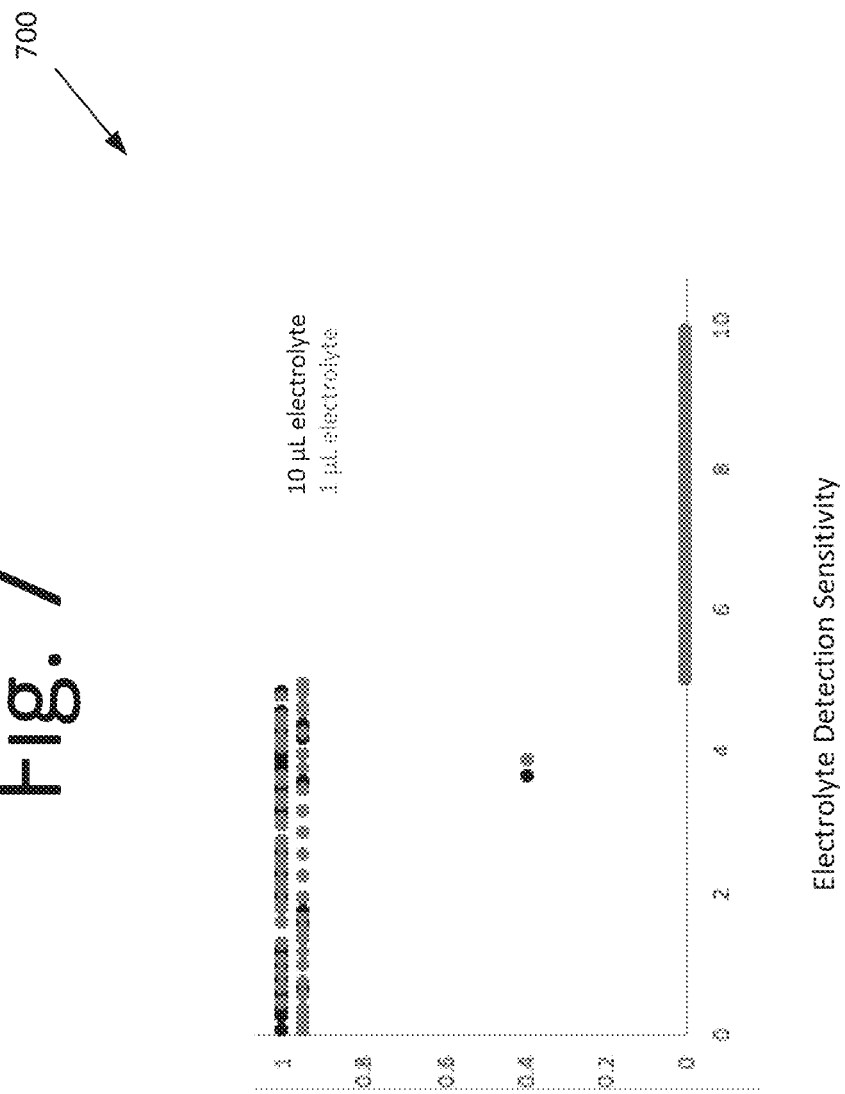
FIGS. 7 and 8 are graphs and showing the capacitive signal change in the presence of electrolyte and selected confounding signals, according to an embodiment of the present invention.
Figure 8:
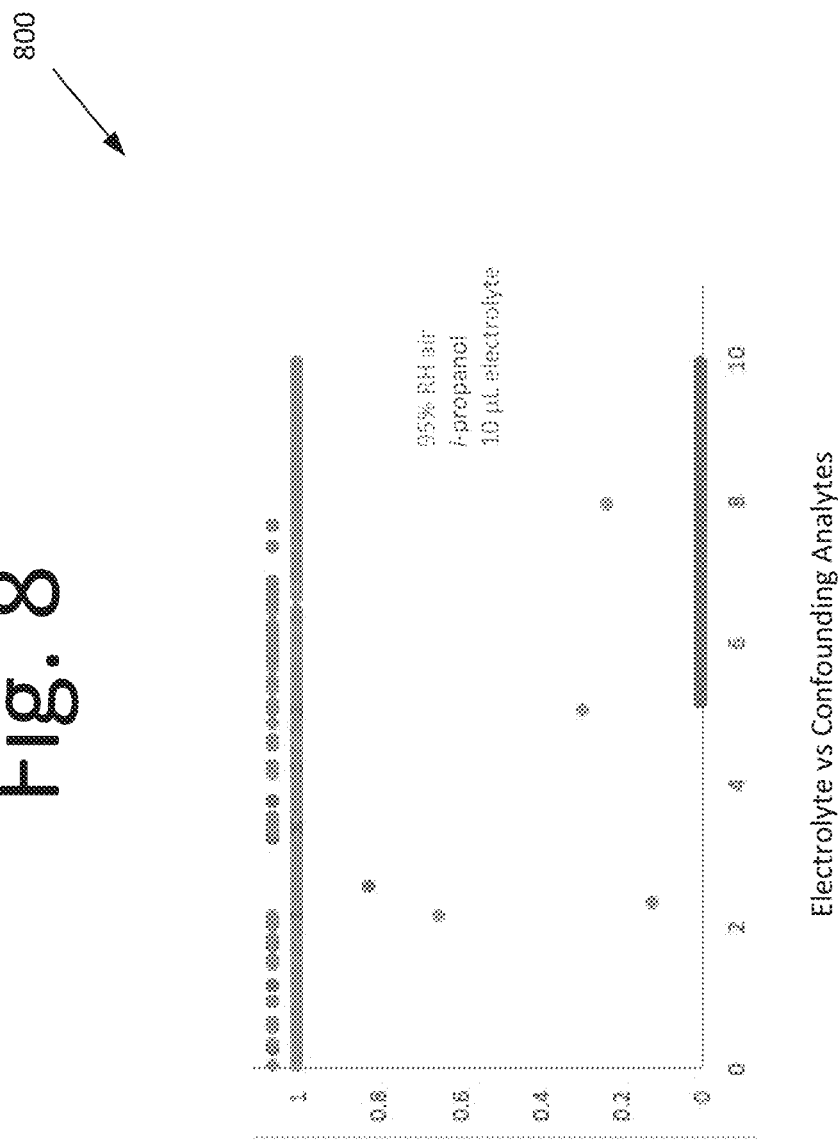

Chip 104 may perform capacitive or other electronic measurements between leads 110 and 112. For purposes of explanation, a capacitive measurement is a type of electrical measurement such as a voltage measurement or current measurement. The capacitance measurement may show a change in capacitance when bridged by an ionically conductive species, such as the electrolyte, or when polymer (or wick) 106 is suffused with the electrolyte. Ionically conductive species include both materials that conduct electricity through electrons (e.g., conductive materials such as metals) or species that have mobile charged particles (e.g., ions moving in a liquid or gel). This change in capacitance indicates that leads 110 and 112 are bridged by ionic substance that can wet or permeate a polymer coating around and between leads 110 and 112. This is indicative of an electrolyte leak, as the electrolyte should be the only chemical present that can carry ions and still wet wick (or polymer) 106. This measurement may occur as soon as any amount of electrolyte exits crimp seal (i.e. leaked) 108 and breaches bridged leads 110 and 112. FIGS. 7 and 8 are graphs 700 and 800 showing the capacitive signal change in the presence of electrolyte and selected confounding signals, according to an embodiment of the present invention. Only the electrolyte shows a change in signal, the signal response is highly sensitive, as leaks of as little as 1 µL of electrolyte were detected.

Chip 104 may transmit the leak measurements back to the BMU for cell management to mitigate the consequence of a leak. This communication is sent through wireless means, such as an antenna, on or adjacent to the chip in communication with the BMU. For example, FIG. 9 is a diagram illustrating a system 900 comprising cell 102 communicating with a BMU 902, according to an embodiment of the present invention. In some embodiments, an antenna 904 is located on cell 102 and is configured to communicate with BMU 902. In some embodiments, antenna 904 is printed on the nonconductive wrapper of cell 102. BMU 902 may have the capability to receive, process and respond to wireless communications from cell 102, through the use of its own antenna.

Returning back to FIG. 1, cell management in some embodiments include string bypass, module deactivation, user alert, and/or replacement. A BMU, in some embodiments, detects the presence of the electrolyte and either mitigates the risk though active battery management by shutting off access to the battery, isolating the portion of the battery that has a leak, sending a signal to the user for maintenance or replacement of the leaking unit, evacuating the area for personnel safety, or activating fire suppression protocols.

Figure 2:
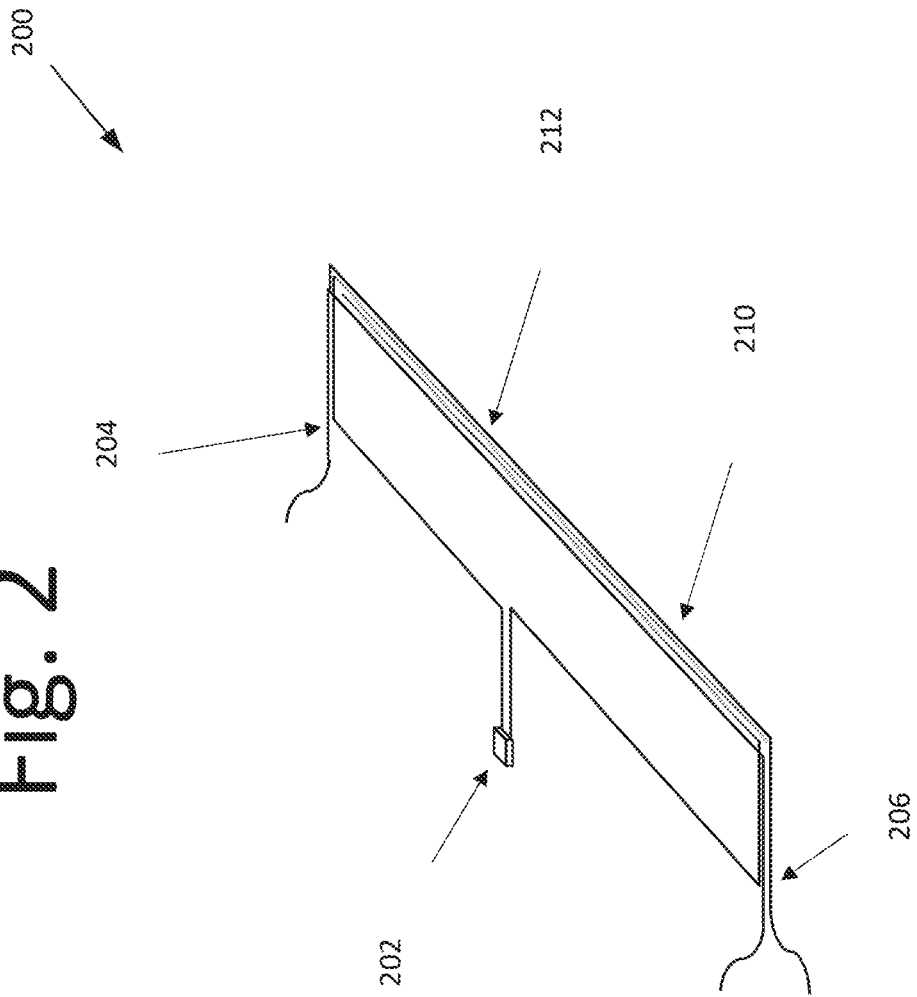
FIG. 2 is a diagram illustrating a chip on a pouch cell, according to an embodiment of the present invention.

FIG. 2 is a diagram illustrating a chip 202 of pouch cell 200, according to an embodiment of the present invention. In some embodiment, chip 202 is connected to lead 210 and lead 212 by placing leads 210 and 212 at an area of potential leaks in a pouch cell 200. Pouch cell 200 may be defined as a cell whose enclosing material is flexible or semirigid, with seals made from melting, gluing, or compression of the pouch material to itself. Pouch cell 200 have long seals 204 and 206 around the edge. This allows for chip 202 to have leads 210 and 212 running along crimp seal 204 and 206 for detection of a leak. This embodiment shows leads 210 and 212 between which the measurement detection is made can be of any shape so as to enclose areas of pouch cell 200 that are of concern for leaks.

In some embodiments, pair of leads 210 and 212 running along a seal 204 or 206 of pouch cell 200 may identify leaks in pouch cell 200 through change in capacitance. In particular, this may be accomplished through leads 210 and 212 along the edge of cell 200 at pouch seal 204 or 206. These leads 210 and 212 may extend along one or more of the battery pouch seals for localization of the leak detection.

Figure 3:
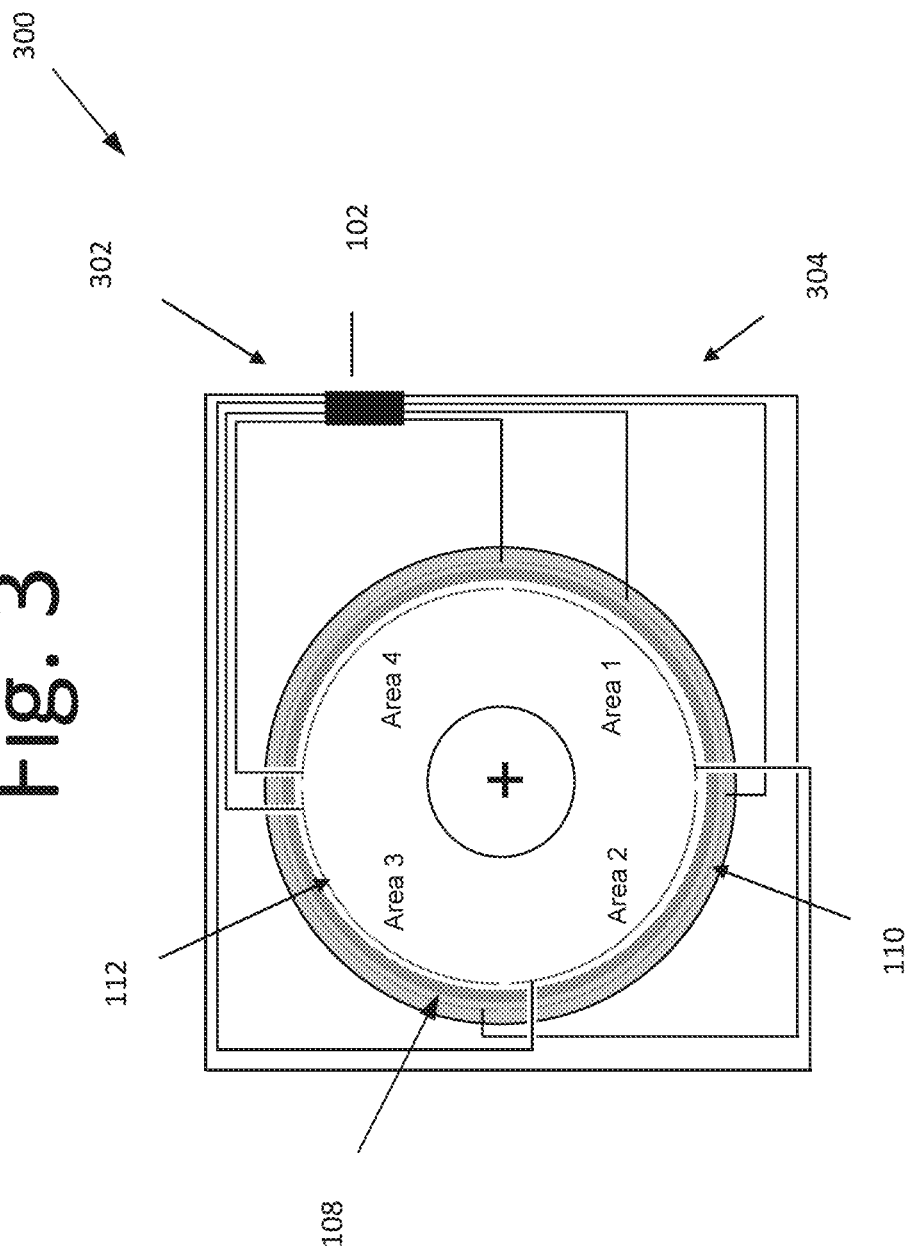
FIG. 3 is a diagram illustrating a front (or top) view of a cell with sensors divided into detection regions, according to an embodiment of the present invention.

FIG. 3 is a diagram illustrating a front (or top) view of a cell 300, according to an embodiment of the present invention. In this embodiment, division of crimp seal 108 or other location, where leaks may occur into different areas of detection, are shown. Also, in this embodiment, chip 102 may have multiple inputs for measurement, allowing for detection of a leak in a specific region of interest while monitoring the entirety of locations of concern for leaks. For example, leads 110, 112 for each region (e.g., Area 1, Area 2, Area 3, Area 4) are separate, or share a single common lead with individual opposite leads for each region (e.g., there can be a single negative lead going to all the locations to be measured) with individual positive leads of any shape or geometry forming a sensor pair for a location. This allows for detection to the common lead through the individual lead circuits by chip 102. In. FIG. 3, identifiers 302 and 304 are locations where the leads 110 and 112 branch out from the sensor to enable multiple measurements simultaneously allowing for specific leak detection in different locations.

Figure 4B:
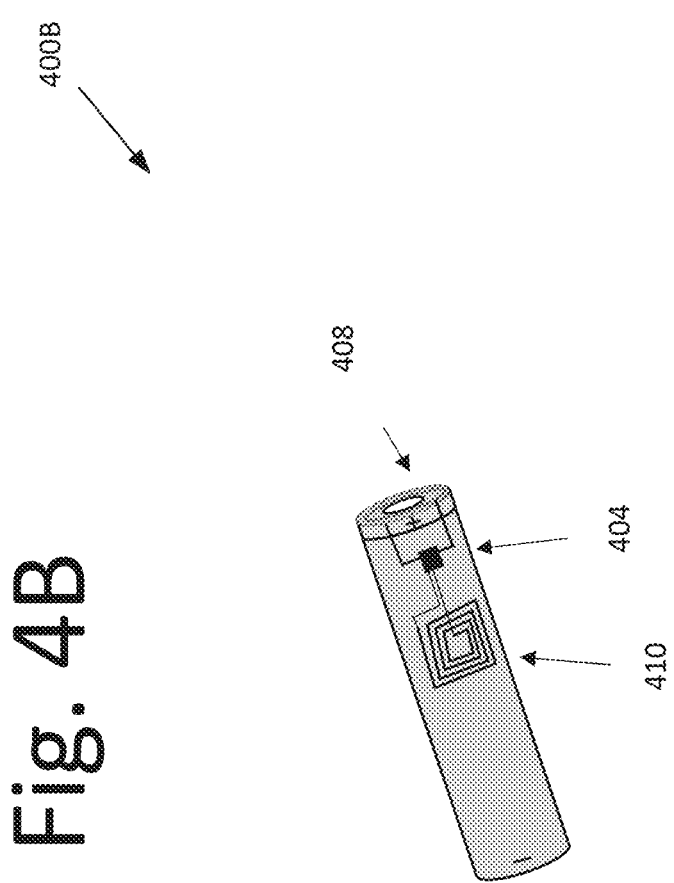

FIGS. 4A and 4B are diagrams illustrating a cell 400A or 400B for leak detection system, according to an embodiment of the present invention. In this embodiment, a chip 404 is on cell 400A or 400B. Additionally, in this embodiment, other detection locations on or around cell 400A or 400B are shown for leak detection. For example, leaks may arise from cell 400A or 400B in an unexpected location, requiring either a large number of detection locations with sensor leads 408, or location of leak detection in areas where leaking electrolyte may accumulate. In this embodiment, sensor pair 406 is located away from the crimp seal of cell 402. This location may be either a location predicted to accumulate leaking electrolyte or a location that has an elevated probability of a leak occurring away from crimp seal. It should be appreciated that number of leads 408 required and their location(s) may be tailored to the applications and its probability to generate leaks. In certain embodiments, cell antenna 408 may also be placed near chip 404, and is configured to communicate measurements to the BMU or receive a signal for executing a measurement from the BMU.

FIG. 5 is a flow diagram illustrating a method 500 for determination of the leak detection threshold through the capacitance detection limit ($C_L$), according to an embodiment of the present invention. Depending on the embodiment, method 500 begins at 502 with the chip (or BMU) generating a capacitance $C_L$ detection limit. For purposes of explanation, chip 104 will be referred to as executing one or more of the below steps. The capacitance $C_L$ detection limit may be based on prior calibration of the sensor in a laboratory testing environment for the battery cells to be used with the leak detection system or in testing similar cells. This detection limit is determined through monitoring of leaks in cell testing or through creation of artificial leaks, where a known amount of electrolyte is placed bridging the leads. In monitoring of naturally occurring leaks in cell testing, the smallest detected (or a value less than any detected leak response) capacitance value of the sensors after the leak may be set as the capacitance detection limit $C_L$. This value may also be determined through application of the minimum unacceptable volume of electrolyte between the leads and recording of the capacitance detection limit $C_L$. In application, when the capacitance value for a sensor falls to this value or below, the detection chip records a leak for this sensor.

Since the capacitance for a set of sensors is dependent on the material of the sensors, surrounding materials and their geometry, this capacitance detection limit $C_L$ value is determined for each induvial sensor, or a value for capacitance detection limit $C_L$ is determined by the use of a fractional value of a baseline capacitance $C_{n0}$ for the sensor. This value may then be determined from testing of the sensors with leaks or electrolyte volumes as in the above paragraphs, or may be set as a fixed deviation from the initial capacitance, for example, 1/10 of the initial capacitance.

At 504, the BMU updates a test schedule and/or frequency schedule, which is received by the chip. The test schedule is a measurement procedure for leak detection based on a schedule, which is determined either as a time frequency (e.g., every 1 second) or as a schedule with varying time periods between testing based on conditions (e.g., periods of high stress for the cells, times of high danger from a leaking cell, or other times when a higher or lower frequency of testing may be required). The frequency may also be repeated or periodic measurement of the sensor for which the measurement of the sensor may be averaged or otherwise weighted as indicated by the BMU.

Figure 6:
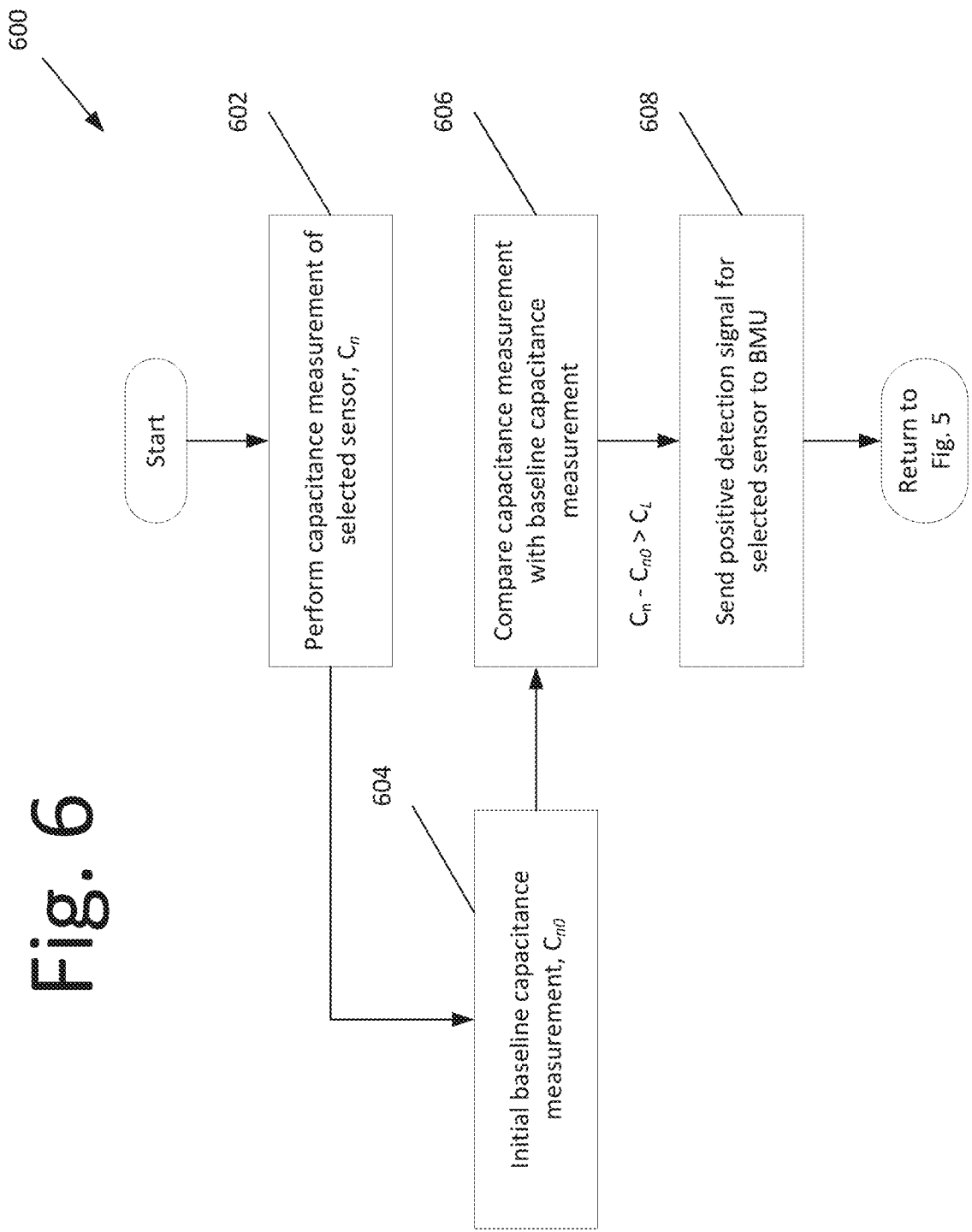
FIG. 6 is a flow diagram illustrating a method for performing measurements on the cell, according to an embodiment of the present invention.

At 506, the chip is woken up (or the state of chip is changed) from a "sleep mode" to a "awake mode" and method 600 of FIG. 6 is activated. In this embodiment, a signal is sent from the BMU to the chip after which the chip performs a measurement of the one or more leak locations as directed by the BMU signal. This signal to wake up may also include updates to the test schedule or frequency. The chip may then proceed to method 600 of FIG. 6 to test the battery for leaks. Additionally, the signal from the BMU to the chip can indicate which sensors are to be measured, from a single sensor controlled by that chip up to all sensors controlled by that chip.

FIG. 6 is a flow diagram illustrating a method 600 for performing measurements on the cell, according to an embodiment of the present invention. In this embodiment, method 600 begins at 602 with the chip performing capacitance measurement $C_n$ of a selected sensor on a cell or other location, and at 604, the chip compares the capacitance measurement $C_n$ to an initial baseline capacitance measurement $C_{n0}$. The initial baseline capacitance measurement value $C_{n0}$ is determined at an initial time for the measurement, either when the sensor is installed or initialized, or this value can be performed to update the baseline condition of the sensor when not leaking. The updating of the baseline—no leak—condition may be necessary to account for ageing of the sensor, for changes to the local environment that may affect the measurement, changes in what may be considered a leak for the application, or other needs. If the comparison of the capacitance measurement $C_n$ shows that capacitance measurement $C_n$ is less than the capacitance detection limit $C_L$, the chip sends a signal to the BMU indicating a leak at that sensor location.

At 606, the chip compares the capacitance measurement $C_n$ with the initial baseline capacitance measurement $C_{n0}$. When the compared capacitance measurement $C_n$ is less than the capacitance detection limit $C_L$ (i.e., $C_n < C_L$), a positive detection signal—leak—for the selected sensor is sent to the BMU. If the measured value is greater than the capacitance detection limit $C_L$, then the chip records—no leak—and sends this information to the BMU.

The measurement of the sensor can be other measurements other than capacitance, including measurement of resistance, conductance, impedance, voltage, inductance, current, or other measurements. These measurements will also have leak detection limit values as determined by the user, and if the measurement of the sensor exceeds this limit value a leak can be reported to the BMU.

Returning to FIG. 5, at 508, the chip returns to sleep mode and may be reactivated upon receipt of a command from the BMU.

FIGS. 7 and 8 are graphs 700 and 800 showing the capacitive signal change in the presence of electrolyte and selected confounding signals, according to an embodiment of the present invention. In graphs 700 and 800, an example of the capacitance response of the sensor to either 1 or 10 μL of electrolyte or in response to 10 μL of electrolyte compared to confounding conditions, including moist (95% relative humidity) air, or a common organic solvent, isopropanol. For this example, the detection limit $C_L$ could be set at 0.1, or 10% of the baseline measurement, and the sensor would only detect an electrolyte leak.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus for detecting leaks in a battery, comprising:
   a plurality of cells, each of the plurality of cells comprising
   a plurality of conductive leads bracketing a cell seal, and
   a wireless measurement and communication chip ("chip") configured to perform an electrical measurement, showing a change in measurement when bridged by ionically conductive species or when a wick is suffused with an electrolyte.

2. The apparatus of claim 1, wherein the plurality of conductive leads are connected to the chip and are contained in a polymer wetted by the electrolyte.

3. The apparatus of claim 2, wherein the polymer is configured to act as a water rejecting electrolyte wick.

4. The apparatus of claim 1, wherein the chip performs a capacitive measurement or an electrical measurement between the pair of conductive leads, and a change in capacitance between the plurality of conductive leads is measured in the presence of an electrolyte leak.

5. The apparatus of claim 1, wherein the plurality of conductive leads are located in an area of the cell that is prone to leaks, the area of the cell that is prone to leaks being areas adjacent to the cell seal or areas of the cell that are exposed to an environment leading to a puncture in the cell.

6. The apparatus of claim 1, wherein the chip is configured to transmit leak measurements to a battery management unit (BMU) for cell management.

7. The apparatus of claim 6, wherein the chip is further configured to transmit the leak measurements to a battery management unit (BMU) through wireless communication.

8. The apparatus of claim 1, wherein, when each of the plurality of cells are pouch cells, the chip is connected to the plurality of conductive leads by placing the pair of conductive leads at an area of potential leaks in the pouch cells, the area of the potential leaks being areas adjacent to the cell seals or areas of the cell that are exposed to an environment leading to a puncture in the cell.

9. The apparatus of claim 8, wherein the pouch cells have seals around an edge of the cell, and the chip employs a sensor having the plurality of conductive leads running along the seal for detection of the leak.

10. The apparatus of claim 8, further comprising:

a sensor pair running along a seal of the pouch cells are configured to identify leaking pouch cells through change in capacitance through the plurality of conductive leads along the edge of the cell where the pouch cells were sealed.

11. The apparatus of claim 1, wherein the chip comprising a plurality of inputs for measurement, allowing for detection of the leak in a specific region and concurrently monitoring each location of concern for the leak, each location of concern being areas adjacent to the cell seal or areas of the cell that are exposed to an environment leading to a puncture in the cell.

12. The apparatus of claim 11, wherein a pair of conductive leads for each region is separate or share a single common lead with individual opposite leads for each region, allowing for detection to a common lead through individual lead circuits by the chip.

* * * * *